United States Patent
Whitten et al.

(10) Patent No.: US 9,176,950 B2
(45) Date of Patent: Nov. 3, 2015

(54) SYSTEM AND METHOD FOR PREDICTING CUSTOMER SATISFACTION

(71) Applicant: Bank of America Corporation, Charlotte, NC (US)

(72) Inventors: Michael L. Whitten, Saint Marys, GA (US); John M. Perkner, Ponte Vedra, FL (US); Jacob Keikiokelii Sistrunk, Bothell, WA (US)

(73) Assignee: Bank of America Corporation, Charlotte, NC (US)

( * ) Notice: Subject to any disclaimer, the term of this patent is extended or adjusted under 35 U.S.C. 154(b) by 190 days.

(21) Appl. No.: 13/712,600

(22) Filed: Dec. 12, 2012

(65) Prior Publication Data

US 2014/0163961 A1    Jun. 12, 2014

(51) Int. Cl.
G06F 17/27    (2006.01)
G06Q 30/02    (2012.01)

(52) U.S. Cl.
CPC ........ G06F 17/2785 (2013.01); G06Q 30/0201 (2013.01)

(58) Field of Classification Search
CPC .................................................. G06F 17/2785
USPC .............................................................. 704/9
See application file for complete search history.

(56) References Cited

U.S. PATENT DOCUMENTS

| | | | |
|---|---|---|---|
| 5,745,649 A | 4/1998 | Lubensky | |
| 7,027,987 B1 | 4/2006 | Franz et al. | |
| 7,263,484 B1 | 8/2007 | Cardillo et al. | |
| 7,313,521 B1 | 12/2007 | Cardillo et al. | |
| 7,324,939 B1 | 1/2008 | Cardillo et al. | |
| 7,366,668 B1 | 4/2008 | Franz et al. | |
| 7,406,415 B1 | 7/2008 | Cardillo et al. | |
| 7,475,065 B1 | 1/2009 | Cardillo et al. | |
| 7,769,587 B2 | 8/2010 | Cardillo et al. | |
| 8,170,873 B1 | 5/2012 | Morris | |
| 8,340,957 B2* | 12/2012 | Gallagher et al. | 704/9 |
| 8,888,497 B2* | 11/2014 | Farahat et al. | 434/238 |
| 8,909,771 B2* | 12/2014 | Heath | 709/224 |
| 2009/0292583 A1 | 11/2009 | Eilam et al. | |
| 2010/0070276 A1 | 3/2010 | Wasserblat et al. | |
| 2011/0007889 A1 | 1/2011 | Geffen et al. | |
| 2011/0125499 A1 | 5/2011 | Griggs et al. | |
| 2012/0059656 A1 | 3/2012 | Garland et al. | |
| 2012/0059708 A1* | 3/2012 | Galas et al. | 705/14.43 |
| 2012/0059713 A1* | 3/2012 | Galas et al. | 705/14.49 |
| 2012/0203776 A1 | 8/2012 | Nissan | |
| 2013/0073336 A1* | 3/2013 | Heath | 705/7.29 |

* cited by examiner

*Primary Examiner* — Susan McFadden
(74) *Attorney, Agent, or Firm* — Michael A. Springs (57) ABSTRACT

A system includes a memory and a processor communicatively coupled to the memory. The memory stores interaction data associated with an interaction between a customer and an associate of an entity. The processor is operable to determine, from the interaction data, one or more keywords in the interaction between the customer and the associate, determine an order of the one or more keywords, and determine a grouping of the one or more keywords. The processor determines, based on the determined keywords, order, and grouping, a perception of the entity by the customer, the determination of the perception of the entity occurring in real-time after the interaction between the customer and the associate.

18 Claims, 5 Drawing Sheets

330 — ASSOCIATE: Hello. Thank you for calling, how may I help you?

330 — CUSTOMER: I am [very] [frustrated] by your [website][!] I cannot view my statement[!]. The online help page is [not] [very] [helpful] at all[!].

310 — ASSOCIATE: I am sorry you are having trouble with our [website]. Let me see if I can help you. Can you tell me specifically what you see?

CUSTOMER: When I click the link to open my statement, nothing happens at all.

ASSOCIATE: Okay, I think I understand what may be going on. Do you have a pop-up blocker on your browser? A pop-up blocker is a tool that prevents some websites from opening new windows in your browser. Most browsers these days have one.

CUSTOMER: Yes, I think I probably do have one of those.

ASSOCIATE: Ok, let's try this. Hold down the control key on your keyboard while clicking the link to open your statement and tell me what you see.

CUSTOMER: That worked[!] I can see it now. [Thank you] so much[!]

ASSOCIATE: No problem. Is there anything else I can help you with today?

CUSTOMER: No, that is it. You have been [very] [helpful]. [Thank you][!]

ASSOCIATE: Thank you for calling. Have a great day.

*FIG. 3A*

ASSOCIATE: *Hello. Thank you for calling, how may I help you?* 310

CUSTOMER: *I cannot view my statement on your [website]. Can you help me?*

ASSOCIATE: *I am sorry you are having trouble with our website. Let me see if I can help you. Can you tell me specifically what you see?*

CUSTOMER: *When I click the link to open my statement, nothing happens at all.*

ASSOCIATE: *Okay, I think I understand what may be going on. Do you have a pop-up blocker on your browser?*

370 [<SILENCE>]

ASSOCIATE: *Sir, do you have a pop-up blocker on your browser?*

CUSTOMER: *Uh, what is a pop-up blocker?*

ASSOCIATE: *A pop-up blocker is a tool that prevents some websites from opening new windows in your browser.*

CUSTOMER: *Uh, I have [no idea] what you are talking about.*

ASSOCIATE: *Ok, let's try this. Hold down the control key on your keyboard while clicking the link to open your statement and [tell ...]* 340  350

CUSTOMER: *Do [what?] Hold down [what?] This is so* 310 [frustrating][!] 350

ASSOCIATE: *I apologize. Please look for a key on your keyboard that says "CTRL." Do you see that?*

CUSTOMER: *Yes.*

ASSOCIATE: *Please hold that key down while you click on the link with your mouse.* 310  350

CUSTOMER: *That worked. I can see my statement now. Why does your website have to use pop-ups? How [frustrating][!]*

ASSOCIATE: *I apologize. Is there anything else I can help you with today?* 350

CUSTOMER: *No, that is it. I sure wish I didn't have to* 320 [waste my time] *calling to get help for things like this[!]*

ASSOCIATE: *I apologize. [Thank you] for calling. Have a nice day.* 320

SYSTEM AND METHOD FOR PREDICTING CUSTOMER SATISFACTION

TECHNICAL FIELD

The present disclosure relates generally to customer interactions and more specifically to a system and method for predicting customer satisfaction.

BACKGROUND

Many businesses provide its customers various ways to contact an associate of the business in order to request assistance, to receive information, or to conduct business. As one example, a financial institution may operate a call center in which associates of the financial institution answer phone calls from customers regarding the customer's business with the financial institution. As another example, a business may employee associates to communicate via Internet chat sessions with its customers in order to answer questions and assist with any problems its customers may experience. Typically, entities such as financial institutions may rely on data such as customer surveys to gain knowledge of the customer's satisfaction or experience with the entity. However, customer survey data may be unreliable and may take an extended period of time to receive and analyze.

SUMMARY OF THE INVENTION

In accordance with the present disclosure, the disadvantages and problems associated with prior systems and methods of determining customer satisfaction have been substantially reduced or eliminated.

According to one embodiment of the present invention, a system includes a memory and a processor communicatively coupled to the memory. The memory stores interaction data associated with an interaction between a customer and an associate of an entity. The processor is operable to determine, from the interaction data, one or more keywords in the interaction between the customer and the associate, determine an order of the one or more keywords, and determine a grouping of the one or more keywords. The processor determines, based on the determined keywords, order, and grouping, a perception of the entity by the customer, the determination of the perception of the entity occurring in real-time after the interaction between the customer and the associate.

Certain embodiments of the disclosure may provide one or more advantages. An advantage of one embodiment may be that an interaction between a customer and an associate of an entity may be analyzed in real-time and used to predict the customer's perception of the entity. In some embodiments, interactions between a customer and an associate of an entity may be analyzed in real-time and used to coach or provide feedback to the associate. In some embodiments, future actions by the customer may be predicted using an analysis of an interaction between a customer and an associate of an entity.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description taken in conjunction with the accompanying drawings, in which:

FIGS. 3A and 3B illustrate example interactions that may be analyzed by the system of FIG. 1 for predicting customer satisfaction.

DETAILED DESCRIPTION OF THE INVENTION

Embodiments of the present disclosure and its advantages are best understood by referring to FIGS. 1 through 4 of the drawings, like numerals being used for like and corresponding parts of the various drawings.

Banks and other entities typically employ associates to handle communications from its customers. As one example, an associate of a financial institution may receive a phone call from a customer requesting information or service on the customer's account. As another example, an associate of an entity may interact with a customer via an Internet chat session in order to assist the customer with the entity's website.

Typically, a customer's satisfaction with an entity is difficult to determine. In some solutions, customer survey data may be used. For example, customers who interact with an entity are given the option to participate in a survey in which the customer may indicate how satisfied they are with the service they received. Customer surveys, however, may be undesirable because they may take an extended amount of time to receive and analyze. Furthermore, solutions such as customer surveys may be unreliable because they are limited to those customers who choose to participate in the survey. As a result, typical solutions do not provide an accurate or timely prediction of the customer's perception of the entity or any future actions the customer may take.

The teachings of the disclosure recognize that it would be desirable to provide a prediction of a customer's perception of an entity in a more efficient, accurate, and timely manner. FIGS. 1 through 4 below illustrate a method and system for predicting customer satisfaction according to the teachings of the disclosure.

Figure 1:
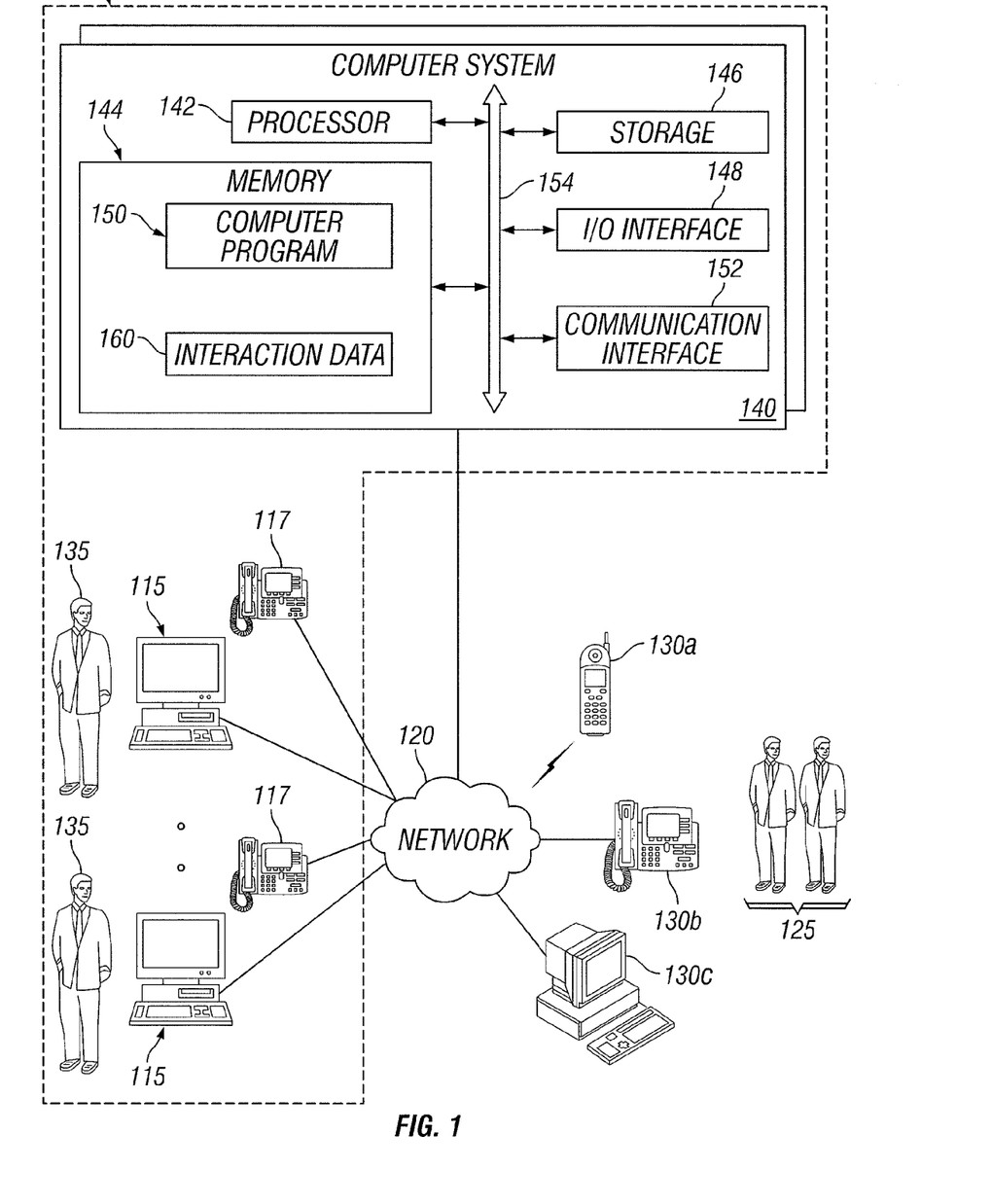
FIG. 1 illustrates a system for predicting customer satisfaction, according to certain embodiments.

FIG. 1 illustrates a system 100 for predicting customer satisfaction, according to certain embodiments. System 100 includes an enterprise 110, one or more computer systems 140, one or more associate workstations 115, one or more telephones 117, and one or more customer devices 130. Computer systems 140, workstations 115, telephones 117, and customer devices 130 may be communicatively coupled by one or more networks 120. In some embodiments, computer systems 140, workstations 115, telephones 117, and/or customer devices 130 may be directly communicatively coupled. System 100 is generally operable to provide a prediction of customer satisfaction based on interactions between associates 135 and customers 125, as described below.

In general, one or more computer systems 140 of enterprise 110 predict whether a customer 125 is satisfied with enterprise 110 based on an interaction between customer 125 and associate 135. Customer 125 may first utilize a customer device 130 to initiate an interaction with an associate 135. For example, customer 125 may initiate a phone call to telephone 117 of associate 135 using customer device 130a or 130b. As another example, customer 125 may initiate an Internet chat session with associate 135 using customer device 130c. The interaction between customer 125 and associate 135 is recorded by workstation 115, telephone 117, computer system 140, or any other appropriate computer system. Interaction data 160 associated with the interaction between customer 125 and associate 135 is then generated by workstation 115, telephone 117, computer system 140, or any other appropriate computer system or software. Computer system 140 may then analyze interaction data 160 in real-time or near real-time after the interaction between customer 125 and associate 135 in order to predict a perception of enterprise 110 by customer 135, to predict a future action of customer 125, and/or to provide feedback to associate 135. For example, computer system 140 may analyze interaction data 160 associated with a phone call between customer 125 and associate 135 in order to determine whether customer 125 is satisfied with enterprise 110 and/or to predict whether customer 125 will continue doing business with enterprise 110.

In some embodiments, enterprise 110 may refer to a financial institution such as a bank. In certain embodiments, enterprise 110 may refer to any organization, entity, business, company, agency, and the like. In some embodiments, enterprise 110 may include one or more computer systems 140. Computer system 140 is described in more detail below.

Workstation 115 may refer to any device that enables associate 135 to interact with customer 125. In some embodiments, workstation 115 may include a computer, Internet browser, tablet computer, electronic notebook, Personal Digital Assistant (PDA), pager, or any other suitable device (wireless, wireline, or otherwise), component, or element capable of receiving, processing, storing, and/or communicating information with customer device 130 and other components of system 100. Workstation 115 may also comprise any suitable user interface, display, microphone, keyboard, or any other appropriate terminal equipment. Telephone 117 may refer to any appropriate telecommunications device including, but not limited to, an Internet Protocol (IP) phone, a land-line phone, a cellular phone, and the like. It will be understood that system 100 may comprise any number and combination of workstations 115 and telephones 117. Workstation 115 and/or telephone 117 may be utilized by associate 135 to interact with customer 125 and capture interaction data 160, as described below.

In certain embodiments, network 120 may refer to any interconnecting system capable of transmitting audio, video, signals, data, messages, or any combination of the preceding. Network 120 may include all or a portion of a public switched telephone network, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Customer 125 may refer to any customer, prospective or former customer, user, or any other person who contacts associate 135 of enterprise 110. Customer device 130 may refer to any appropriate device that customer 125 utilizes to contact enterprise 110. In the illustrated embodiment, for example, customer device 130 may include a mobile customer device 130a such as a smartphone, any appropriate telephone 130b, any computer 130c such as a laptop, desktop, or tablet computer, or any other appropriate user device. Customer devices 130 are communicatively coupled to enterprise 110, workstation 115, and/or telephone 117 via one or more networks 120.

Associate 135 is any person associated with enterprise 110. For example, associate 135 may be an employee of enterprise 110. In another example, associate 135 may be an employee of a call center associated with enterprise 110. In general, associate 135 interacts with customer 125 using workstation 115 and/or telephone 117.

Computer systems 140 perform one or more steps of one or more methods described or illustrated herein. In particular embodiments, one or more computer systems 140 provide functionality described or illustrated herein. In particular embodiments, software running on one or more computer systems 140 performs one or more steps of one or more methods described or illustrated herein or provides functionality described or illustrated herein. Particular embodiments include one or more portions of one or more computer systems 140.

This disclosure contemplates any suitable number of computer systems 140. This disclosure contemplates computer system 140 taking any suitable physical form. As example and not by way of limitation, computer system 140 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computer system 140 may include one or more computer systems 140; be unitary or distributed; span multiple locations; span multiple machines; or reside in a cloud, which may include one or more cloud components in one or more networks. Where appropriate, one or more computer systems 140 may perform without substantial spatial or temporal limitation one or more steps of one or more methods described or illustrated herein. As an example and not by way of limitation, one or more computer systems 140 may perform in real-time or in batch mode one or more steps of one or more methods described or illustrated herein. One or more computer systems 140 may perform at different times or at different locations one or more steps of one or more methods described or illustrated herein, where appropriate.

In some embodiments, computer system 140 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computer system 140 may be a web server running web server applications such as Apache, Microsoft's Internet Information Server™, and the like.

In particular embodiments, computer system 140 includes a processor 142, memory 144, storage device 146, an input/output (I/O) interface 148, a communication interface 152, and a bus 154. Although this disclosure describes and illustrates a particular computer system having a particular number of particular components in a particular arrangement, this disclosure contemplates any suitable computer system having any suitable number of any suitable components in any suitable arrangement.

In particular embodiments, processor 142 includes hardware for executing instructions, such as those making up a computer program 150. As an example and not by way of limitation, to execute instructions, processor 142 may retrieve (or fetch) the instructions from an internal register, an internal cache, memory 144, or storage device 146; decode and execute the instructions; and then write one or more results to an internal register, an internal cache, memory 144, or storage device 146. In particular embodiments, processor 142 may include one or more internal caches for data, instructions, or addresses. This disclosure contemplates processor 142 including any suitable number of any suitable internal caches, where appropriate. As an example and not by way of limitation, processor 142 may include one or more instruction caches, one or more data caches, and one or more translation lookaside buffers (TLBs). Instructions in the instruction caches may be copies of instructions in memory 144 or storage device 146, and the instruction caches may speed up retrieval of those instructions by processor 142. Data in the data caches may be copies of data in memory 144 or storage device 146 for instructions executing at processor 142 to operate on; the results of previous instructions executed at processor 142 for access by subsequent instructions executing at processor 142 or for writing to memory 144 or storage device 146; or other suitable data. The data caches may speed up read or write operations by processor 142. The TLBs may speed up virtual-address translation for processor 142. In particular embodiments, processor 142 may include one or more internal registers for data, instructions, or addresses. This disclosure contemplates processor 142 including any suitable number of any suitable internal registers, where appropriate. Where appropriate, processor 142 may include one or more arithmetic logic units (ALUs); be a multi-core processor; or include one or more processors 142. Although this disclosure describes and illustrates a particular processor, this disclosure contemplates any suitable processor.

In particular embodiments, memory 144 includes main memory for storing instructions such as computer program(s) 150 for processor 142 to execute, or data for processor 142 to operate on. As an example and not by way of limitation, computer system 140 may load instructions from storage device 146 or another source (e.g., another computer system 140) to memory 144. Processor 142 may then load the instructions from memory 144 to an internal register or internal cache. To execute the instructions, processor 142 may retrieve the instructions from the internal register or internal cache and decode them. During or after execution of the instructions, processor 142 may write one or more results (which may be intermediate or final results) to the internal register or internal cache. Processor 142 may then write one or more of those results to memory 144. In particular embodiments, processor 142 executes only instructions in one or more internal registers or internal caches or in memory 144 (as opposed to storage device 146 or elsewhere) and operates only on data in one or more internal registers or internal caches or in memory 144 (as opposed to storage device 146 or elsewhere). One or more memory buses (which may each include an address bus and a data bus) may couple processor 142 to memory 144. Bus 154 may include one or more memory buses, as described below. In particular embodiments, one or more memory management units (MMUs) reside between processor 142 and memory 144 and facilitate accesses to memory 144 requested by processor 142.

In certain embodiments, instructions executed by processor 142 may reside in one or more computer programs 150. Computer program 150 generally refers to instructions, logic, rules, algorithms, code, tables, or other suitable instructions for performing the described functions and operations. In some embodiments, computer program 150 may be stored in memory 144, storage device 146, or any other location accessible to computer system 140. Where appropriate, computer program 150 may include one or more computer programs 150; be unitary or distributed; span multiple locations; span multiple machines; or reside in a cloud.

In particular embodiments, storage device 146 includes mass storage for data or instructions such as computer program 150. As an example and not by way of limitation, storage device 146 may include an HDD, a floppy disk drive, flash memory, an optical disc, a magneto-optical disc, magnetic tape, a Universal Serial Bus (USB) drive, a solid-state drive (SSD), or a combination of two or more of these. Storage device 146 may include removable or non-removable (or fixed) media, where appropriate. Storage device 146 may be internal or external to computer system 140, where appropriate. In particular embodiments, storage device 146 is non-volatile, solid-state memory. In particular embodiments, storage device 146 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 146 taking any suitable physical form. Storage device 146 may include one or more storage control units facilitating communication between processor 142 and storage device 146, where appropriate. Where appropriate, storage device 146 may include one or more storage devices 146. Although this disclosure describes and illustrates particular storage, this disclosure contemplates any suitable storage.

In particular embodiments, I/O interface 148 includes hardware, software, or both providing one or more interfaces for communication between computer system 140 and one or more I/O devices. System 100 may include one or more of these I/O devices, where appropriate. One or more of these I/O devices may enable communication between a person and computer system 140. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 148 for them. Where appropriate, I/O interface 148 may include one or more devices or software drivers enabling processor 142 to drive one or more of these I/O devices. I/O interface 148 may include one or more I/O interfaces 148, where appropriate. Although this disclosure describes and illustrates a particular I/O interface, this disclosure contemplates any suitable I/O interface.

In particular embodiments, communication interface 152 includes hardware, software, or both providing one or more interfaces for communication (e.g., packet-based communication and facsimile communication) between computer system 140 and one or more other computer systems 140, one or more networks such as network 120, exchange hub 130, and one or more entities 135. As an example and not by way of limitation, communication interface 152 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 152 for it. As an example and not by way of limitation, computer system 140 may communicate with an ad hoc network, a personal area network (PAN), a local area network (LAN), a wide area network (WAN), a metropolitan area network (MAN), one or more portions of the Internet, a PSTN, or a combination of two or more of these. One or more portions of one or more of these networks may be wired or wireless. As an example, computer system 140 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

Computer system 140 may include any suitable communication interface 152 for any of these networks, where appropriate. Communication interface 152 may include one or more communication interfaces 152, where appropriate. Although this disclosure describes and illustrates a particular communication interface, this disclosure contemplates any suitable communication interface.

In particular embodiments, bus 154 includes hardware, software, or both coupling components of computer system 140 to each other. As an example and not by way of limitation, bus 154 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 154 may include one or more buses 154, where appropriate. Although this disclosure describes and illustrates a particular bus, this disclosure contemplates any suitable bus or interconnect.

Interaction data 160 may be any data related to an interaction between customer 125 and associate 135. For example, interaction data 160 may include speech-to-text data of a voice conversation between customer 125 and associate 135. As another example, interaction data 160 may include an index of words, keywords (e.g., keywords 310), and/or phrases of an interaction between customer 125 and associate 135. A particular embodiment of interaction data 160 is illustrated below in reference to FIG. 2 and particular embodiments of interactions between customer 125 and associate 135 are illustrated below in reference to FIGS. 3A and 3B.

Figure 2:
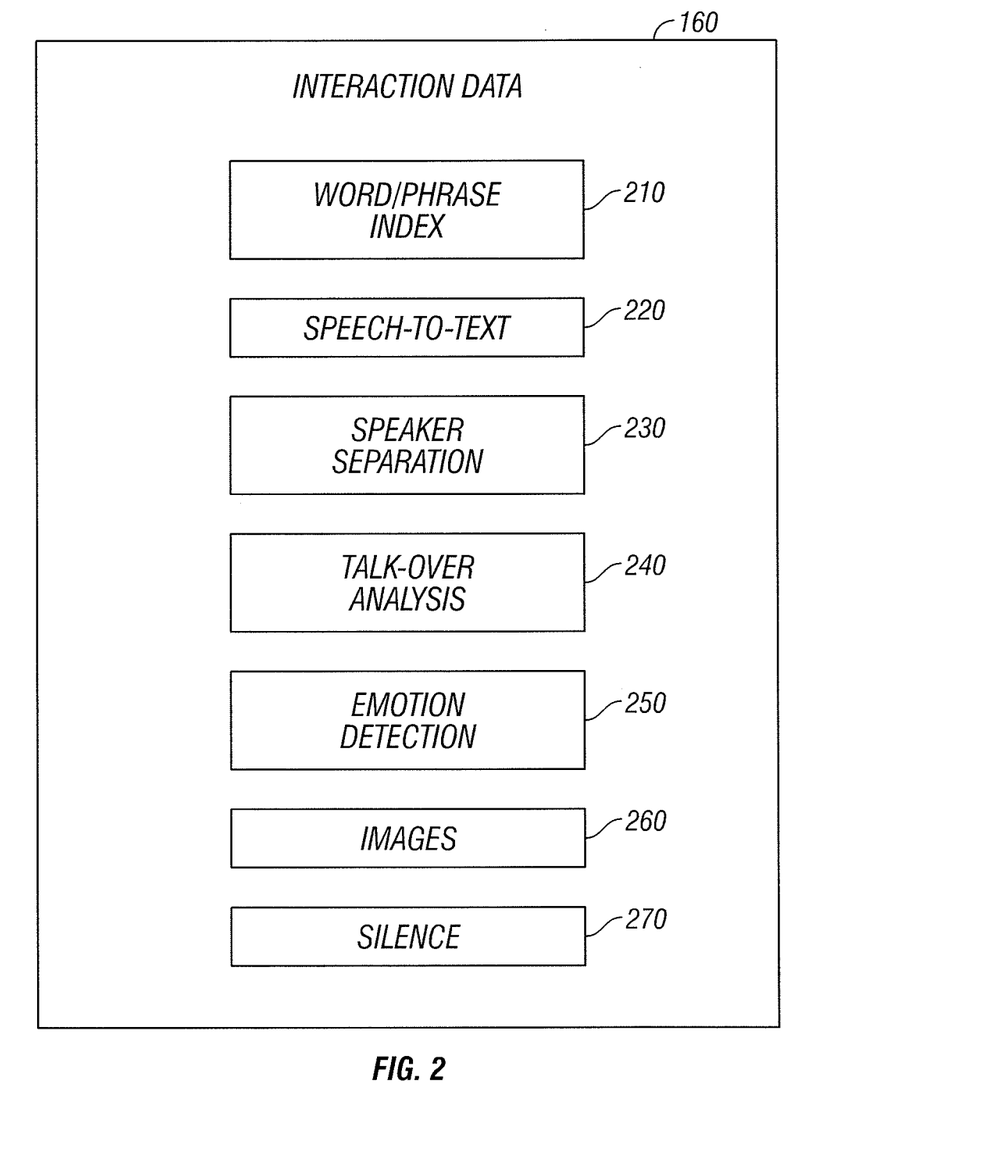
FIG. 2 illustrates example interaction data that may be utilized by the system of FIG. 1 for predicting customer satisfaction, according to certain embodiments.

FIG. 2 illustrates example interaction data 160 that may be utilized by system 100 for predicting customer satisfaction. In general, interaction data 160 is utilized by system 100 for analyzing an interaction between customer 125 and associate 135 such as the interactions illustrated in FIGS. 3A and 3B. Interaction data 160 may be analyzed in order to determine a perception of customer 125 of enterprise 110, predict future actions of customer 125, and/or provide feedback and/or training to associate 135. Instead of utilizing customer survey data that some systems utilize, system 100 analyzes interaction data 160 in real-time after an interaction between customer 125 and associate 135 in order to timely predict how satisfied customer 125 is with enterprise 110, to predict an action that customer 125 may take next, and/or to provide feedback to associate 135. As a result, enterprise 110 may take any appropriate action almost immediately after an interaction between customer 125 and associate 135. These actions may include, for example, taking an action to increase the satisfaction of customer 125, taking an action to confirm or acknowledge the interaction between customer 125 and associate 135, and provide feedback to associate 135 for training and/or coaching purposes.

In the illustrated embodiment, interaction data 160 includes a word/phrase index 210, speech-to-text data 220, speaker separation data 230, talk-over analysis data 240, emotion detection data 250, image data 260, and silence data 270. In some embodiments, interaction data 160 may include more or fewer data elements than illustrated in FIG. 2.

Figure 3A:
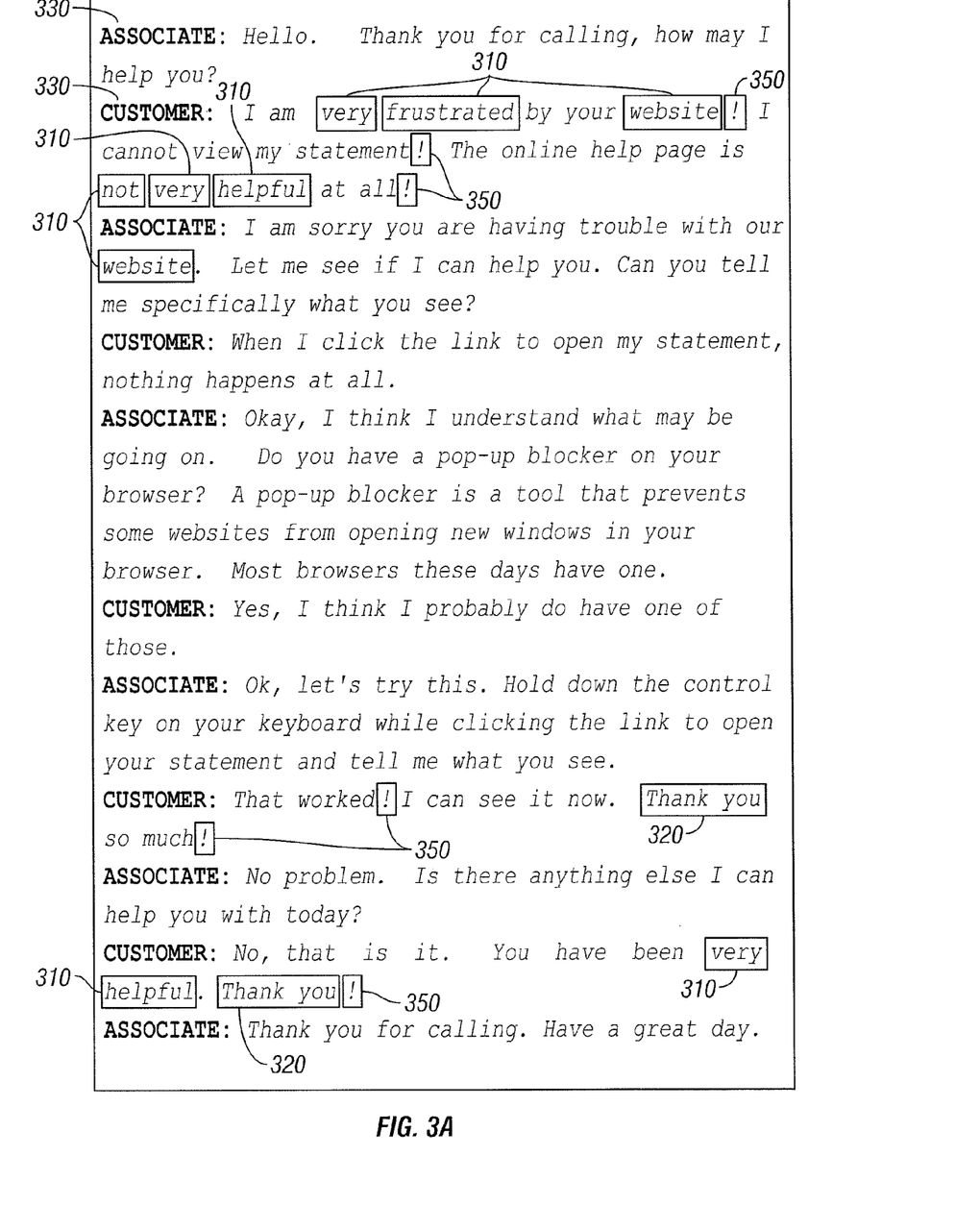

Word/phrase index 210 may refer to an index of words, keywords, and phrases (e.g., a string of more than one word) from an interaction between customer 125 and associate 135. For example, a voice conversation between customer 125 and associate 135 may be captured and converted into text. Example conversations between customer 125 and associate 135 are illustrated in FIGS. 3A and 3B. Each word of the conversation may then be indexed in word/phrase index 210 to allow for future reference or analysis.

In some embodiments, certain words in an interaction between customer 125 and associate 135 may be indexed and/or tagged as keywords in word/phrase index 210. For example, keywords 310 (e.g., "very," "frustrated," "website," "not," "helpful," and "frustrating") in FIGS. 3A and 3B may be identified and tagged as keywords in word/phrase index 210. In some embodiments, a predefined list of keywords may be accessed and utilized to tag words spoken in a conversation between customer 125 and associate 135 as keywords. For example, a predefined list of keywords may be stored in memory 144 and compared to a voice conversation between customer 125 and associate 135 in order to identify keywords 310. System 100 may then utilize keywords 310 to predict how satisfied customer 125 is with enterprise 110.

In some embodiments, certain phrases in the conversation may be indexed and/or tagged as a phrase in word/phrase index 210. For example, phrases 320 (e.g., "thank you" and "waste my time") in FIGS. 3A and 3B may be identified and tagged as phrases in word/phrase index 210. Phrases 320 may then be utilized to predict how satisfied customer 125 is with enterprise 110.

Speech-to-text data 220 may refer to any data associated with converting a spoken conversation into text. For example, a conversation between customer 125 and associate 135 as illustrated in FIGS. 3A and 3B may be captured and converted into speech-to-text data 220. Speech-to-text data 220 may be in any appropriate format that allows computer program 150 to search for and identify specific keywords and/or phrases that were included in the interaction between customer 125 and associate 135.

Speaker separation data 230 is any data indicating which participant is speaking in an interaction. For example, as illustrated in FIGS. 3A and 3B, speaker separation data 230 may include speaker indications 330. In the illustrated interactions, for example, speaker indications 330 include "associate" and "customer."

Talk-over analysis data 240 is any data indicating that one participant in an interaction has spoken over another participant and/or multiple participants are speaking at the same time. For example, talk-over indication 340 in FIG. 3B illustrates that "customer" has talked over "associate." Such data may be utilized by system 100 to determine that one participant is frustrated, that there is confusion in the interaction, that one participant is more engaged or dominant than another, and the like. In some embodiments, talk-over analysis data 240 may indicate a detection of individual instances of when participants are speaking over each other and/or a frequency of instances of participants speaking over each other.

Emotion detection data 250 is any data that indicates emotion or inflection by a participant in an interaction. For example, emotion indications 350 in FIGS. 3A and 3B illustrate that "customer" showed emotion and/or voice inflection on several occasions during the interactions with "associate." Such data may be utilized by system 100 to determine that one participant is frustrated or pleased, that there is confusion in the interaction, that one participant is more engaged or dominant than another, and the like.

In some embodiments, interaction data 160 may include image data 260. Image data 260 may include, for example, still images or video captured from a video chat between customer 125 and associate 135. In some embodiments, captured images or video may be processed and stored as image data 260. For example, gestures by customer 125 in images captured from a video chat between customer 125 and associate 135 may be determined and stored in image data 260.

Some embodiments of interaction data 160 may include silence data 270. Silence data 270 is any data that indicates a period of silence between participants in an interaction. For example, silence indication 370 in FIG. 3B illustrates a period of silence after "associate" asked "customer" a question. Silence data 270 may be utilized by system 100 to determine that there is confusion in the interaction, that one participant is not engaged in the interaction, that there is tension between the participants, and the like.

In operation, one or more computer systems 140 of enterprise 110 analyze an interaction between customer 125 and associate 135 in order to determine whether customer 125 is satisfied with enterprise 110 and/or predict a future action by customer 125. In some embodiments, the interaction between customer 125 and associate 135 may be, for example, a telephone call. In some embodiments, the interaction may be an Internet chat or video session. In some embodiments, the interaction may be an in-person interaction that is captured by a video camera (e.g., a surveillance camera at a branch location of a bank). The interaction between customer 125 and associate 135 is captured by any appropriate software or device such as computer system 140, workstation 115, telephone 117, a camera, and the like. Interaction data 160 is generated from the interaction and stored in, for example, memory 144 or one or more storage devices 146. As described above in reference to FIG. 2, interaction data 160 may include one or more of a word/phrase index 210, speech-to-text data 220, speaker separation data 230, talk-over analysis data 240, emotion detection data 250, image data 260, and silence data 270.

Once interaction data 160 is captured and/or generated, computer system 140 accesses interaction data 160 in order to analyze the interaction between customer 125 and associate 135. In some embodiments, computer system 140 may analyze interaction data 160 in order to determine a perception of enterprise 110 by customer 125. For example, interaction data 160 may be analyzed to determine whether customer 125 is satisfied with enterprise 110. As one specific example, computer system 140 may determine that customer 125 is satisfied with enterprise 110 if it determined from interaction data 160 that the interaction between customer 125 and associate 135 ended on a positive note (e.g., with customer 125 being pleased.) As another specific example, computer system 140 may determine that customer 125 is not satisfied with enterprise 110 if it determines from interaction data 160 that the interaction between customer 125 and associate 135 ended on a negative note (e.g., with customer 125 being upset or unhappy). Certain methods for determining whether an interaction between customer 125 and associate 135 ended on a positive or negative note are discussed further below. In some embodiments, Boolean logic may be utilized to analyze two or more of the described methods (e.g., using keywords 310, phrases 320, emotion indications 350, etc.) in analyzing an interaction between customer 125 and associate 135.

In some embodiments, computer system 140 may identify one or more keywords 310 in interaction data 160 in order to determine a perception of enterprise 110 by customer 125. In some embodiments, computer system 140 may access a predefined list of keywords 310 and determine if any of the predefined keywords 310 are included in interaction data 160 associated with an interaction between customer 125 and associate 135. In some embodiments, keywords 310 may be tagged as either a positive keyword 310 (e.g., a word associated with a positive interaction) or a negative keyword 310 (e.g., a word associated with a negative interaction). As an example for illustrative purposes only, consider an interaction between customer 125 and associate 135 in which computer system 140 determines that positive keywords 310 of "helpful" and "useful" were spoken by customer 125. Computer system 140 may utilize these keywords in determining that the interaction between customer 125 and associate 135 was a positive interaction and thus customer 125 is satisfied with enterprise 110. As another example for illustrative purposes only, consider an interaction between customer 125 and associate 135 in which computer system 140 determines that negative keywords 310 of "useless" and "worthless" were spoken by customer 125. Computer system 140 may utilize these keywords in determining that the interaction between customer 125 and associate 135 was a negative interaction and thus customer 125 is not satisfied with enterprise 110.

In some embodiments, computer system 140 may identify one or more phrases 320 in interaction data 160 in order to determine a perception of enterprise 110 by customer 125. In certain embodiments, phrases 320 may be two or more keywords 310 in a row. In some embodiments, computer system 140 may access a predefined list of phrases 320 and determine if any of the predefined phrases 310 are included in interaction data 160 associated with an interaction between customer 125 and associate 135. As an example for illustrative purposes only, consider the illustrated interaction between customer 125 and associate 135 of FIG. 3A. In this interaction, computer system 140 determines that phrase 320 of "thank you" was spoken by customer 125. Computer system 140 may utilize this determined phrase 320 in determining that the interaction between customer 125 and associate 135 was a positive interaction and thus customer 125 is satisfied with enterprise 110. As another example for illustrative purposes only, consider the illustrated interaction between customer 125 and associate 135 of FIG. 3B. In this interaction, computer system 140 determines that phrase 320 of "waste my time" was spoken by customer 125. Computer system 140 may utilize this determined phrase 320 in determining that the interaction between customer 125 and associate 135 was a negative interaction and thus customer 125 is not satisfied with enterprise 110.

In certain embodiments, computer system 140 may utilize speaker indications 330 in interaction data 160 in order to determine a perception of enterprise 110 by customer 125. In general, speaker indications 330 may be used to determine if one speaker is dominating a conversation, whether one speaker is not engaged in a conversation, whether the participants are equally participating in the conversation, and the like. As an example for illustrative purposes only, consider an interaction between customer 125 and associate 135 in which speaker indications 330 indicate that customer 125 is doing most of the talking. This may indicate, for example, that customer 125 is upset and is ranting and/or airing grievances. Computer system 140 may thus determine that customer 125 is not satisfied with enterprise 110. As another example for illustrative purposes only, consider an interaction between customer 125 and associate 135 in which speaker indications 330 indicate that associate 135 is talking more than customer 125. This may indicate, for example, that customer 125 is listening more to what associate 135 has to say. Computer system 140 may thus determine that customer 125 is satisfied with enterprise 110.

In certain embodiments, computer system 140 may identify one or more talk-over indications 340 in interaction data 160 in order to determine a perception of enterprise 110 by customer 125. As an example for illustrative purposes only, consider the illustrated interaction between customer 125 and associate 135 of FIG. 3A. In this interaction, computer system 140 determines that no talk-over indications 340 are present. Computer system 140 may utilize this in determining that the interaction between customer 125 and associate 135 was a positive interaction and thus customer 125 is satisfied with enterprise 110. As another example for illustrative purposes only, consider the illustrated interaction between customer 125 and associate 135 of FIG. 3B. In this interaction, computer system 140 determines that one talk-over indication 340 is present. Computer system 140 may utilize this in determining that the interaction between customer 125 and associate 135 was a negative interaction and thus customer 125 is not satisfied with enterprise 110.

In some embodiments, computer system 140 may determine that an interaction between customer 125 and associate 135 was a negative interaction if there are greater than or equal to a threshold amount of talk-over indications 340. Similarly, some embodiments of computer system 140 may determine that an interaction between customer 125 and associate 135 was a positive interaction if there are less a threshold amount of talk-over indications 340.

In certain embodiments, computer system 140 may identify one or more emotion indications 350 in interaction data 160 in order to determine a perception of enterprise 110 by customer 125. Emotion indications 350 may be any indication of emotion or inflection in the speaker's voice. As an example for illustrative purposes only, consider the illustrated interaction between customer 125 and associate 135 of FIG. 3A. In this interaction, computer system 140 determines that there are multiple emotion indications 350 associated with customer 125. Specifically, there are multiple emotion indications 350 at the beginning of the interaction when customer 125 is explaining his frustrations, and again towards the end of the interaction when customer 125 discovers his problem has been solved. As described further below, emotion indications 350 may be used alone or in combination with keywords 310 to determine whether customer 125 is satisfied with enterprise 110.

In some embodiments, emotion indications 350 may be compared to a predetermined or configurable threshold in determining whether customer 125 is satisfied with enterprise 110. For example, if there are greater than or equal to a threshold amount of emotion indications 350 for customer 125, computer system 140 may determine that the interaction between customer 125 and associate 135 was a negative interaction (e.g., that customer 125 got emotional too many times on a call) and thus customer 125 is not satisfied with enterprise 110. Similarly, some embodiments of computer system 140 may determine that an interaction between customer 125 and associate 135 was a positive interaction if there are less a threshold amount of talk-over indications 340 for customer 125. In some embodiments, if there are greater than or equal to a threshold amount of emotion indications 350 for associate 135, computer system 140 may determine that the interaction between customer 125 and associate 135 was a negative interaction (e.g., that associate 125 got emotional too many times on a call) and use this to provide coaching or instruction to associate 135.

In certain embodiments, emotion indications 350 may be used in combination with keywords 310 or phrases 320 in determining whether customer 125 is satisfied with enterprise 110. For example, consider the illustrated interaction between customer 125 and associate 135 of FIG. 3A. In this interaction, computer system 140 determines that there are multiple emotion indications 350 associated with customer 125 at the beginning of the interaction when customer 125 is explaining his frustrations. Computer system 140 may examine keywords 310 in close proximity to emotion indications 350 in determining whether this portion of the interaction was positive or negative. In this case, the emotion indications 350 are in close proximity to negative keywords 310 (e.g., "frustrated") and thus computer system 140 determines that this is a negative portion of the interaction. Conversely, there are numerous emotion indications 350 towards the end of the interaction when customer 125 discovers his problem has been solved. In this portion of the interaction, the emotion indications 350 are in close proximity to positive keywords 310 (e.g., "helpful") and positive phrases (e.g., "thank you") and thus computer system 140 determines that this is a positive portion of the interaction.

In certain embodiments, computer system 140 may utilize image data 260 in interaction data 160 in order to determine a perception of enterprise 110 by customer 125. As described above, image data 260 may include, for example, still images or video captured from a video chat between customer 125 and associate 135. In some embodiments, image data 260 may be still images or video captured from a surveillance video of an in-person interaction customer 125 and associate 135. In certain embodiments, computer system 140 may analyze the still images or video in order to determine one or more gestures of customer 125 or associate 135. The determined gestures may then be used in determining whether customer 125 is satisfied with enterprise 110. For example, if computer system 140 determines that customer 125 made obscene or rude gestures to associate 135, computer system 140 may determine that customer 125 is not satisfied with enterprise 110. As another example, if computer system 140 determines that customer 125 did not make any unusual or obscene gestures to associate 135, computer system 140 may determine that customer 125 is satisfied with enterprise 110.

In certain embodiments, computer system 140 may identify silence indications 370 in interaction data 160 in order to determine a perception of enterprise 110 by customer 125. As an example for illustrative purposes only, consider the illustrated interaction between customer 125 and associate 135 of FIG. 3A. In this interaction, computer system 140 determines that no silence indications 370 are present. Computer system 140 may utilize this in determining that the interaction between customer 125 and associate 135 was a positive interaction and thus customer 125 is satisfied with enterprise 110. As another example for illustrative purposes only, consider the illustrated interaction between customer 125 and associate 135 of FIG. 3B. In this interaction, computer system 140 determines that one silence indication 370 is present. Computer system 140 may utilize this in determining that the interaction between customer 125 and associate 135 was a negative interaction and thus customer 125 is not satisfied with enterprise 110. In some embodiments, computer system 140 may determine that an interaction between customer 125 and associate 135 was a negative interaction if there are greater than or equal to a threshold amount of silence indications 370. Similarly, some embodiments of computer system 140 may determine that an interaction between customer 125 and associate 135 was a positive interaction if there are less a threshold amount of silence indications 370.

In certain embodiments, computer system 140 determines, from interaction data 160, an order of one or more keywords 310 in analyzing an interaction between customer 125 and associate 135. As an example for illustrative purposes only, consider the illustrated interaction between customer 125 and associate 135 of FIG. 3A. In this interaction, computer system 140 determines that negative keyword 310 of "frustrated" occurred before positive keyword 310 of "helpful." Computer system 140 may thus determine that customer 125 was unhappy at the first of the interaction but was happy when the interaction ended. Computer system 140 may then determine that the interaction between customer 125 and associate 135 was a positive interaction and that customer 125 is satisfied with enterprise 110.

In some embodiments, computer system 140 determines, from interaction data 160, a grouping of one or more keywords 310 in order to determine a perception of enterprise 110 by customer 125. As an example for illustrative purposes only, consider the illustrated interaction between customer 125 and associate 135 of FIG. 3A. In this interaction, computer system 140 determines that customer 125 spoke negative keyword 310 of "not" immediately before keyword 310 of "very" and positive keyword 310 of "helpful." Computer system 140 may thus determine that because a negative keyword 310 was grouped with two positive keywords 310, this portion of the interaction between customer 125 and associate 135 was negative. As another example, computer system 140 may determine that customer 125 spoke keyword 310 of "very" immediately before negative keyword 310 of "frustrated." Computer system 140 may thus determine that because keyword 310 of "very" was grouped with a negative keyword 310, this portion of the interaction between customer 125 and associate 135 was negative.

In certain embodiments, computer system 140 may analyze interaction data 160 in order to predict a future action by customer 125. In some embodiments, for example, computer system 140 may determine from interaction data 160 that customer 125 is likely to close an account held at enterprise 110. For example, if customer 125 mentions a keyword 310 of "close" or "account," and computer system 140 determines that the interaction between customer 125 and associate 135 was a negative interaction, computer system 140 may predict that customer 125 is going to close his account. Computer system 140 may predict any appropriate future action by customer 125 such as opening another account, recommending enterprise 110 to other people, performing a self-service action on a website of enterprise 110, and the like.

In certain embodiments, the determination of the perception of the entity occurs in real-time or near-real time after the interaction between the customer and the associate. As described above, typical methods of relying on customer survey data are not desirable because it may take an extended period of time (e.g., days or weeks) to receive the customer survey data. Computer system 140, however, analyzes interaction data 160 in real-time or near real-time after the interaction between the customer 125 and associate 135. As used herein "near real-time" and "real-time" refers to the actual time or approximate time (e.g., within 1 second, within 5 seconds, within 10 seconds, within 20 seconds, within 30 seconds, within 1 minute, within 2 minutes, within 5 minutes or less) that an event occurs. Thus, certain embodiments of computer system 140 analyze interaction data 160 within this time frame after an interaction between customer 125 and associate 135 to provide rapid, useful feedback and analysis about the interaction.

In some embodiments, an analysis of interaction data 160 may be used for coaching purposes or to provide feedback to associate 135 about an interaction with customer 125. For example, if computer system 140 determines that an interaction with customer 125 was a negative interaction (e.g., if it is determined that customer 125 is not satisfied with enterprise 110), computer system 140 may provide feedback in real-time after the interaction that it is likely that customer 125 had a bad experience. Likewise, if computer system 140 determines that an interaction with customer 125 was a positive interaction (e.g., if it is determined that customer 125 is satisfied with enterprise 110), computer system 140 may provide feedback in real-time after the interaction that it is likely that customer 125 had a good experience.

As an example for illustrative purposes, consider the interaction of FIG. 3B. In this interaction, computer system 140 may determine that the interaction is a negative interaction due to, for example, keywords 310, talk-over indication 340, and emotion indications 350 associated with customer 125. Computer system 140 may then provide feedback in real-time to associate 135 that customer 125 had a negative experience and is likely not satisfied with enterprise 110. This immediate feedback is valuable because it informs associate 135 of the negative interaction while the interaction is still fresh in the mind of associate 135. As a result, associate 135 may learn what mistakes were made during the interaction and correct them on future interactions.

Figure 4:
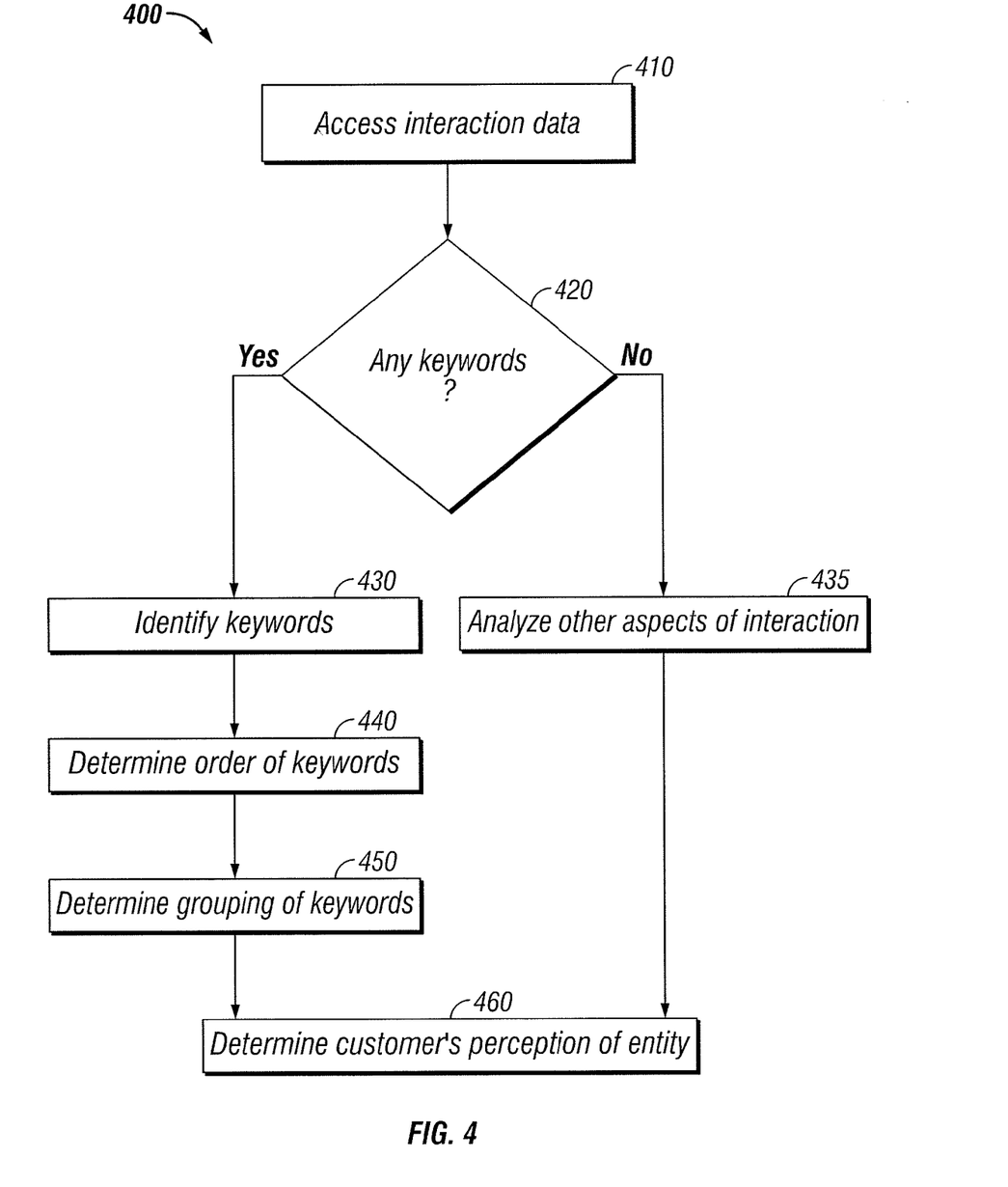
FIG. 4 illustrates a method for predicting customer satisfaction, according to certain embodiments.

FIG. 4 illustrates one embodiment of a method 400 for predicting customer satisfaction. Method 400 may be implemented, for example, by one or more computer programs 150 in computer system 140. Method 400 begins in step 410 where interaction data is accessed. In some embodiments, the interaction data refers to interaction data 160 discussed above. In some embodiments, the interaction data was generated by workstation 115, telephone 117, computer system 140, or any other appropriate computing system or software. The interaction data is any data captured or created from an interaction between a customer and an associate of an entity.

In step 420, it is determined whether the interaction data accessed in step 410 contains any keywords. In some embodiments, the keywords of step 420 refer to keywords 310 described above. In some embodiments, the interaction data is cross-referenced with a pre-established list of keywords. In some embodiments, they keywords may be positive, negative, or neutral keywords. If it is determined that the interaction data contains keywords, method 400 proceeds to step 430. If it is determined that the interaction data does not contain keywords, method 400 proceeds to step 435.

In step 430, the interaction data accessed in step 410 is analyzed to identify the keywords. In some embodiments, step 430 includes categorizing the keywords as positive or negative keywords, counting the keywords, determining which participant spoke each keyword, and the like. In some embodiments, step 430 includes tagging the keywords for future analysis.

In step 440, an order of the identified keywords from step 430 is determined. In some embodiments, step 440 includes determining whether an interaction began positive and ended negative. In some embodiments, step 440 includes determining whether an interaction began negative and ended positive.

In step 450, a grouping of the identified keywords from step 430 is determined. In some embodiments, step 450 includes determining that two or more keywords are immediately next to each other. In some embodiments, step 450 includes determining that two or more keywords are within a predetermined distance from each other. For example, the distance may include within a certain number of words from each other in the same sentence, paragraph, or speaker indication. After step 450, certain embodiments of method 400 proceed to step 460. In some embodiments, method 400 proceeds to step 435 after step 450.

In step 435, other aspects of the interaction are analyzed. In some embodiments, step 435 includes analyzing the interaction data of step 410 for phrases such as phrases 320. In some embodiments, step 435 includes analyzing the interaction data of step 410 for talk-over indications such as talk-over indications 340. In some embodiments, step 435 includes analyzing the interaction data of step 410 for emotion indications such as emotion indications 350. In some embodiments, step 435 includes analyzing the interaction data of step 410 for image data such as image data 260. In some embodiments, step 435 includes analyzing the interaction data of step 410 for silence data such as silence data 270.

In step 460, a perception of the entity by the customer is determined based on the analysis of the interaction data of step 410. In some embodiments, the perception of the entity by the customer is based on the determined keywords of step 430, the determined order of the keywords of step 440, and the determined grouping of the keywords of step 450. In some embodiments, the determination the perception of the entity of step 460 occurs in real-time or real-time after the interaction between the customer and the associate. In some embodiments, the perception of the entity by the customer is additionally or alternatively based on other aspects of the interaction of step 435. After step 460, method 400 ends in some embodiments. In some embodiments, method 400 may utilize the determined perception of the entity by the customer of step 460 to determine a future action by the customer or provide feedback or coaching to the associate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, capable, configured, enabled, operable, or operative.

What is claimed is:

1. A system, comprising:
  a telephone operable to facilitate an interaction between a customer and an associate of an entity;
  one or more memory units; and
  a processor communicatively coupled to the telephone and the one or more memory units and operable to:
    record the interaction between the customer and the associate of the entity and store the interaction in the one or more memory units;
    using the recorded interaction, automatically generate interaction data and store the interaction data in the one or more memory units, wherein the interaction data comprises:
      speaker separation data indicating whether the customer or the associate of the entity is speaking in the interaction; and
      talk-over data indicating one or more instances when the customer and the associate of the entity are speaking over each other;
    retrieve the stored interaction data and determine, from the retrieved interaction data, one or more keywords in the interaction between the customer and the associate;
    determine, from the retrieved interaction data, an order of the one or more keywords;
    determine, from the retrieved interaction data, a grouping of the one or more keywords;
    determine, based on the keywords, order, grouping, speaker separation data, and talk-over data, a perception of the entity by the customer, the determination of the perception of the entity occurring in real-time after the interaction between the customer and the associate.

2. The system of claim 1, wherein the interaction data further comprises one or more of:
  a word/phrase index;
  speech-to-text data;
  emotion data;
  one or more images; and
  silence data.

3. The system of claim 1, the processor further operable to determine, from the interaction data, one or more emotion indications in the interaction between the customer and the associate, wherein the determination of the perception of the entity by the customer is further based on the one or more emotion indications.

4. The system of claim 1, the processor further operable to predict, based on the determination of the perception of the entity by the customer, one or more future actions by the customer.

5. The system of claim 1, the processor further operable to provide, based on the determination of the perception of the entity by the customer, feedback to the associate.

6. The system of claim 1, wherein the perception of the entity by the customer is determined using Boolean logic.

7. A method comprising:
  automatically generating, by a computer system, interaction data associated with a recorded interaction between a customer and an associate of an entity, wherein the interaction data comprises:
    speaker separation data indicating whether the customer or the associate of the entity is speaking in the interaction; and
    talk-over data indicating one or more instances when the customer and the associate of the entity are speaking over each other;
  determining, by the computer system from the interaction data, one or more keywords in the interaction between the customer and the associate;
  determining, by the computer system from the interaction data, an order of the one or more keywords;
  determining, by the computer system from the interaction data, a grouping of the one or more keywords; and
  determining, by the computer system based on the keywords, order, grouping, speaker separation data, and talk-over data, a perception of the entity by the customer, the determination of the perception of the entity occurring in real-time after the interaction between the customer and the associate.

8. The method of claim 7, wherein the interaction data comprises data associated with a telephone conversation between the customer and the associate.

9. The method of claim 7, wherein the interaction data comprises data associated with an Internet chat session between the customer and the associate.

10. The method of claim 7, wherein the interaction data further comprises one or more of:
   a word/phrase index;
   speech-to-text data;
   emotion data;
   one or more images; and
   silence data.

11. The method of claim 7, further comprising determining, from the interaction data, one or more emotion indications in the interaction between the customer and the associate, wherein the determination of the perception of the entity by the customer is further based on the one or more emotion indications.

12. The method of claim 7, further comprising predicting, based on the determination of the perception of the entity by the customer, one or more future actions by the customer.

13. The method of claim 7, further comprising providing, based on the determination of the perception of the entity by the customer, feedback to the associate.

14. One or more computer-readable non-transitory storage media embodying software this is operable when executed by one or more computer systems to:
   automatically generate interaction data associated with a recorded interaction between a customer and an associate of an entity, wherein the interaction data comprises:
      speaker separation data indicating whether the customer or the associate of the entity is speaking in the interaction; and
      talk-over data indicating one or more instances when the customer and the associate of the entity are speaking over each other;
   determine, from the interaction data, one or more keywords in the interaction between the customer and the associate;
   determine, from the interaction data, an order of the one or more keywords;
   determine, from the interaction data, a grouping of the one or more keywords; and
   determine, based on the keywords, order, grouping, speaker separation data, and talk-over data, a perception of the entity by the customer, the determination of the perception of the entity occurring in real-time after the interaction between the customer and the associate.

15. The media of claim 14, wherein the interaction data comprises data associated with a telephone conversation between the customer and the associate or an Internet chat session between the customer and the associate.

16. The media of claim 14, wherein the interaction data further comprises one or more of:
   a word/phrase index;
   speech-to-text data;
   emotion data;
   one or more images; and
   silence data.

17. The media of claim 14, the software further operable to determine, from the interaction data, one or more emotion indications in the interaction between the customer and the associate, wherein the determination of the perception of the entity by the customer is further based on the one or more emotion indications.

18. The media of claim 14, the software further operable to predict, based on the determination of the perception of the entity by the customer, one or more future actions by the customer.

\* \* \* \* \*